(12) United States Patent
Giraud Du Poyet et al.

(10) Patent No.: US 12,319,347 B2
(45) Date of Patent: Jun. 3, 2025

(54) METAL STRUCTURAL COMPONENT COMPRISING A HIGHER-DUCTILITY PATCH AND METHOD OF MANUFACTURE THEREOF

(71) Applicant: AUTOTECH ENGINEERING S.L., Amorebieta-Etxano (ES)

(72) Inventors: Quentin Benjamin Giraud Du Poyet, Argenteuil (FR); Unai Lopategi Sanz, Bilbao (ES); Amine Mermitte, Guyancourt (FR); Yoann Aurélien Rullaud, Guyancourt (FR)

(73) Assignee: AUTOTECH ENGINEERING S.L., Amorebieta-Extano (ES)

( * ) Notice: Subject to any disclaimer, the term of this patent is extended or adjusted under 35 U.S.C. 154(b) by 347 days.

(21) Appl. No.: 18/002,841

(22) PCT Filed: Jul. 14, 2021

(86) PCT No.: PCT/EP2021/069610
§ 371 (c)(1),
(2) Date: Dec. 21, 2022

(87) PCT Pub. No.: WO2022/013294
PCT Pub. Date: Jan. 20, 2022

(65) Prior Publication Data
US 2023/0174163 A1    Jun. 8, 2023

(30) Foreign Application Priority Data
Jul. 17, 2020  (EP) ..................................... 20382650

(51) Int. Cl.
*B62D 25/04*   (2006.01)
*B23K 9/007*   (2006.01)
*B62D 29/00*   (2006.01)

(52) U.S. Cl.
CPC .............. *B62D 25/04* (2013.01); *B23K 9/007* (2013.01); *B62D 29/007* (2013.01)

(58) Field of Classification Search
CPC ...... B62D 25/04; B62D 29/00; B62D 29/007; B62D 21/157
(Continued)

(56) References Cited

U.S. PATENT DOCUMENTS 9,623,910 B2 *  4/2017  Kiyoshita .............. B62D 25/04

FOREIGN PATENT DOCUMENTS

CN    106184391 B  * 11/2018 ............ B60J 5/0468
DE    102016116787 B3   10/2017
(Continued)

OTHER PUBLICATIONS

CN106184391 Text (Year: 2018).*
(Continued)

*Primary Examiner* — Dennis H Pedder
(74) *Attorney, Agent, or Firm* — NORTON ROSE FULBRIGHT US LLP

(57) ABSTRACT

Method of manufacturing a metal structural component (E) for a vehicle, comprising the steps of a) providing a planar blank (B); b) cutting out the blank (B) to create an opening (A) having a first portion (Q) and wherein the first portion (Q) of the opening A) has a second length (lt) in a first transverse direction (T); c) welding a patch (P) to the blank (B) so as to cover the opening (A), the patch (P) being made of the metal having greater ductility than the material of the blank (B); d) stamping the assembly formed by the blank (B) and the patch (P) to obtain the component (E).

14 Claims, 8 Drawing Sheets

(58) Field of Classification Search
USPC .......................... 296/193.06, 29, 30, 187.12
See application file for complete search history.

(56) References Cited

FOREIGN PATENT DOCUMENTS

| EP | 3492189 A1 | | 6/2019 |
|----|------------|---|--------|
| KR | 20140002197 A | * | 1/2014 |
| KR | 101865741 B1 | | 5/2018 |

OTHER PUBLICATIONS

KR20140002197 Text (Year: 2014).*
International Search Report and Written Opinion issued in corresponding International Application No. PCT/EP2021/069610 mailed Oct. 7, 2021.

* cited by examiner

METAL STRUCTURAL COMPONENT COMPRISING A HIGHER-DUCTILITY PATCH AND METHOD OF MANUFACTURE THEREOF

CROSS REFERENCE TO RELATED APPLICATIONS

The present application is a national phase application under 35 U.S.C. § 371 of International Application No. PCT/EP2021/069610 filed Jan. 14, 2021, which claims the benefit of priority of European Patent Application No. 20382650.8 filed Jan. 17, 2020. The contents of the referenced applications are incorporated into the present application by reference.

TECHNICAL FIELD

The present invention is encompassed within the manufacture of metal structural components for vehicles, specifically within the manufacture of body-in-white parts, more specifically within the manufacture of profiles.

STATE OF THE ART

In the manufacture of vehicles, the strength and ductility of various parts may be selected in such a way as to control the behavior of the vehicle in the event of a crash and to protect any passengers in the cabin. Some higher ductility parts may be used to absorb shock in the event of a car crash and to reduce the shock absorbed by parts which must be high-strength. It may be advantageous of a single part to comprise zones of high and low ductility. For example, in the case of a B-pillar, an upper section of the pillar must maintain its shape in the event of a crash and not intrude into the cabin as it corresponds to an area where a passenger's head and chest may be located. A lower section of the pillar may be used as a controlled intrusion zone. In particular, when this controlled intrusion zone is made of a higher ductility material across its whole width, it has been observed that in lateral impact crashes, the B-pillar is prone to fold at this area as shown in FIG. 8. To prevent this overall fold and possible breakage of the B-pillar, various methods have been developed to manufacture a shock absorbing zone.

KR101865740 discloses a method for integrated hot-stamping of a blank of various types of steel and addition of a reinforcing member inserted into a slot in a lateral side of a B-pillar. The reinforcing member is folded to produce several overlapping layers and is assembled to the part after hot-stamping and after machining a slot in the side of the part, such that it is not integrally formed. The reinforcing member absorbs shock upon impact and prevents the B-pillar from breaking. However, the layered structure of the reinforced region may add unnecessary weight to the vehicle and affect the overall form.

KR101865741 discloses a method of integrated hot-stamping of a blank of various materials and thicknesses. Here, a pair of reinforcement patches are spot welded to a blank before hot stamping. The patches are located on two lateral areas of a B-pillar which have been cut out. They may absorb shock upon an impact but do not target the area where B-pillar breakage is most likely. In addition, the location of the cut-outs may reduce the overall integrity of the part.

It would therefore be advantageous to provide a method of manufacturing a metal structural component with a shock-absorption zone that overcomes the disadvantages of the prior art.

DESCRIPTION OF THE INVENTION

A first aspect of the invention relates to a method of manufacturing a metal structural component for a vehicle. The component is a profile with at least one portion having a U-shaped cross-section, the portion having a bottom and two lateral walls. The portion has a longitudinal direction, a first transverse direction and a second transverse direction, so that in the U-shaped cross-section of the portion are defined:
  a bottom of the portion, the bottom having a direction coinciding with the first transverse direction; and
  two lateral walls of the portion, the two lateral walls having directions coinciding with the second transverse direction.

It is to be noted that several components of the structure of a vehicle and more particularly of a car, present this U-shaped cross-section.

An intermediate zone of the portion having a U-shaped cross-section, has a first determined length according to the longitudinal direction and comprises a metal having greater ductility than a main material of the component that surrounds the intermediate zone. In this way two materials having different ductility are combined. The method comprises the steps of:
  a) Providing a planar blank comprising the longitudinal and the first transverse directions. The blank may be made of steel, for example ultra-high strength steel (UHSS).
  b) Cutting out the blank to create an opening having a first portion and wherein the first portion of the opening has a second length in the first transverse direction. In this way, by cutting out an appropriate portion, the region of the metal structural component which is free from the material of the blank can be controlled.
  c) Welding a patch to the blank, for example by means of spot welding, so as to cover the opening. In this way, in some regions of the blank, the blank is welded to the patch, whereas in other regions the patch covers the opening. The welding process generates a mechanical joint between the patch and the blank. The patch is made of the metal having greater ductility than the material of the blank, for example, the patch may be made of very high strength steel (VHSS) or extra high strength steel (EHSS). Therefore, the region of the opening covered with the patch has greater ductility than the region which comprises material of the blank.
  d) Stamping the assembly formed by the blank and the patch to obtain the component having the at least one portion having a U-shaped cross-section so that at least part of the bottom of the portion corresponds to the patch on said first determined length and the first portion of the opening of the blank having a second length in the first transverse direction extends from one of the lateral walls to the other lateral wall of the at least one portion.

In this way, upon an impact on a portion of the bottom in which the patch covers the opening, the metal structural component, and more in particular the patch, deforms absorbing a high amount of the impact energy.

In addition, the patch provides a high mechanical continuity between the lateral walls of the U-shaped cross section, as the two lateral walls are mechanically connected through the patch.

In addition, the mechanical response of the metal structural component upon an impact on a portion of the bottom in which the ductile patch covers the opening is improved. The reason is that a high amount of impact energy may be absorbed by deformation of the bottom together with deformation of both lateral walls, as the patch transmits the impact stresses along its whole extension in the first transverse direction.

In addition, the metal structural component is manufactured in a simple manner by means of welding the patch to the blank and stamping the assembly containing the welded patch and blank. In addition, the metal structural component may be manufactured in an even simpler manner since it is enough to cut out a single opening in the blank, weld a single patch to the blank and stamp an assembly containing the single patch and the blank.

In some embodiments, a first lateral wall of the two lateral walls of the portion having a U-shaped cross-section comprises a first curved portion, wherein the first curved portion joins the first lateral wall to the bottom of the portion having a U-shaped cross-section, and wherein the first curved portion has a curvature higher than the curvature of the bottom of the portion; and/or wherein a second lateral wall of the two lateral walls of the portion having a U-shaped cross-section comprises a second curved portion, wherein the second curved portion joins the second lateral wall to the bottom of the portion having a U-shaped cross-section, and wherein the second curved portion has a curvature higher than the curvature of the bottom of the portion.

In this way, the curvature in the U-shaped cross-section of the first and/or of the second curved portions is higher than the curvature of the bottom in the U-shaped cross-section. The first and/or the second curved portion constitute transition regions between the bottom and the lateral walls of the portion having a U-shaped cross-section. The curvature of the transition regions may be reduced in order to decrease abruptness of the transition between the bottom and the lateral walls.

In some embodiments, the step c) is performed such that the patch covers the entire opening of the blank. In this way, mechanical continuity is increased throughout the whole opening.

In some embodiments, it is possible to weld a bigger patch (P) to the blank (B) so that a first portion (DZ) of the patch (P) covers the opening (A) of the blank (B) and a second portion (RZ) of the patch (P), is welded in overlap to the blank (B), creating a region of the component (E) with a double thickness. The patch (P) comprises a single material throughout, wherein the material is of greater ductility than the main material of the blank. The second portion may reinforce the metal structural component. In addition, in this way, with the same manufacturing steps, that is by means of cutting out the opening, welding the patch to the blank and stamping the welded patch and blank, a portion of the metal structural component is reinforced and at the same time, the ductility of another portion the metal structural component is increased. The material of the blank may overlap the second portion of the patch or most of the second portion of the patch. In some of these embodiments, the maximum length of the patch is at least three times that of the maximum length of the first portion of the patch. In this way, upon an impact on a portion of the bottom in which the patch covers the opening, most of the deformation of the patch takes place in the ductile portion of the patch.

In some embodiments, the opening cut out in step b) has a maximum length in the longitudinal direction and step d) is performed such that the opening extends from one of the lateral walls to the other lateral wall along the whole longitudinal direction. In this way, there is a long portion of the opening, in the longitudinal direction, within the lateral walls. The ductility of this long portion is increased upon covering this portion with a ductile patch.

In some embodiments, the opening cut out in step b) has a maximum length in the longitudinal direction, and a first section of said maximum length of the opening comprises the first portion of the opening, and a second section of said maximum length of the opening comprises a second portion of the opening, the second portion having a length in the first transverse direction lower than the length in the first transverse direction of the first portion, such that upon performing the step d) the second portion of the opening is laterally limited by the bottom of the portion having a U-shaped cross-section along the second section of the maximum length. In this way, just a portion of the whole length, in the longitudinal direction, of the opening enters the lateral walls, in particular just the first portion of the opening. Therefore, since the second portion of the opening is shorter in the first transverse direction, and hence smaller, a lower patch extension and hence less patch material is required to cover the opening. In addition, although less material is used, the lateral walls still have a ductile portion, which has a reduced length in the longitudinal direction. In addition, a central portion of the opening within the bottom may be covered with the ductile patch. Therefore, upon an impact on this central portion covered with the patch, the mechanical requirements in order to absorb a high amount of the impact energy are satisfied. The reason is that the ductility required for the deformation of the central portion is adapted to the ductility required for deformation of the lateral walls, providing a synergistic absorption of a high amount of impact energy. At the same, since the second portion of the opening is shorter in the first transverse direction, and hence smaller, more portions of the metal structural component, and more particularly the lateral walls, are made of the material of the blank and hence are stronger. Preferably, the total area within the bottom, that is the total area in plane comprising the longitudinal and the first transverse direction, occupied by the opening is larger than the total area within the lateral walls, that is the total area in planes which are tangent to the lateral wall, occupied by the opening within the lateral walls.

In some embodiments, the maximum length of the opening in the longitudinal direction comprises a third section, wherein the third section comprises a third portion of the opening, wherein the third portion extends from one of the lateral walls to the other lateral wall, and wherein the second portion of the opening is between the first portion of the opening and the third portion of the opening. In this way, it is further improved the absorption of the energy of an impact on a portion of the bottom in which the patch covers the opening. The reason is that each lateral wall is provided with two portions of the opening between which an intermediate portion of the opening is located, the intermediate portion being within the bottom. Hence, by covering the opening with a ductile patch, the lateral walls can be bent at both of the two portions of the opening. This energy absorption is further increased because the four portions of the openings of the lateral walls are connected with the single opening, and hence may be mechanically connected through the ductile patch. Furthermore, the amount of patch material required to cover the opening is further decreased, as the longitudinal extension of the second portion can be decreased since part of the deformation is absorbed by the lateral walls through deformation of the patch covering the third portion of the opening.

In some embodiments, the first portion of the opening comprises at least one extension having a width and a length such that the width is lower than the length, and wherein the at least one extension extend from the second portion of the opening to a lateral wall of the portion having a U-shaped cross-section; and/or wherein the third portion of the opening comprises at least one extension having a width and a length such that the width is lower than the length, and wherein the at least one extension extend from the second portion of the opening to a lateral wall of the portion having a U-shaped cross-section.

In this way the amount of required patch material is decreased. The length of an extension of the opening is the length from the beginning of the extension in the bottom to the end of the extension in a lateral wall. Preferably, the beginning of at least one extension is located at a portion of the opening which is close to an end, in the first transverse direction, of the second portion of the opening. In this way, the amount of patch material is further decreased, while the response of the metal structural component to an impact on a portion of the bottom in which the patch covers the opening is satisfactory, because the extensions ensure the mechanical connection between the bottom and the lateral walls.

In some embodiments, the opening of step b) is limited by an edge of the blank and upon performing the step d) the patch has a raised portion entering the opening, such that a thickness of the opening is decreased.

In some embodiments, upon performing step d) the raised portion comprises the whole portion of the patch covering the opening. In this way mechanical continuity is enhanced throughout the whole opening. The raised portion of the patch may ensure that the whole surface of the part does not lose contact with the tool on one side during its manufacture, affecting the cooling rate of the part. By raising a portion of the patch to fill the gap in the hole, an identical and continuous contact of the part with a manufacturing tool may be ensured. Good cooling may also ensure that the correct tolerances in the area may be maintained. This provides a continuity of material in the area between the hole in the blank and the patch and makes the behavior of the part more homogeneous In some embodiments, step d) is made by hot stamping.

A second aspect of the invention relates to a metal structural component manufactured according to any one of the previous embodiments.

In some embodiments, the metal structural component is a B-pillar. Preferably, the maximum length of the covered opening in the longitudinal direction is of less than one third of the length of the B-pillar and is located in the lower half of the B-pillar. More preferably, the maximum length of the covered opening is of at least 30 mm.

A third aspect of the invention relates to a motor vehicle comprising the metal structural component of any one of the previous embodiments. In this way, upon a side crash, the B-pillar absorbs a high amount of the energy of the impact by means of deforming the ductile patch and hence, by means of deforming the portions of the bottom and the lateral walls covered by the patch.

The different aspects and embodiments of the invention defined in the foregoing can be combined with one another, as long as they are compatible with each other.

Additional advantages and features of the invention will become apparent from the detail description that follows and will be particularly pointed out in the appended claims.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF PREFERRED EMBODIMENTS

The following description is not to be taken in a limiting sense but is given solely for the purpose of describing the broad principles of the invention. Embodiments of the invention will be described by way of example, with reference to the above-mentioned drawings.

Figure 1:
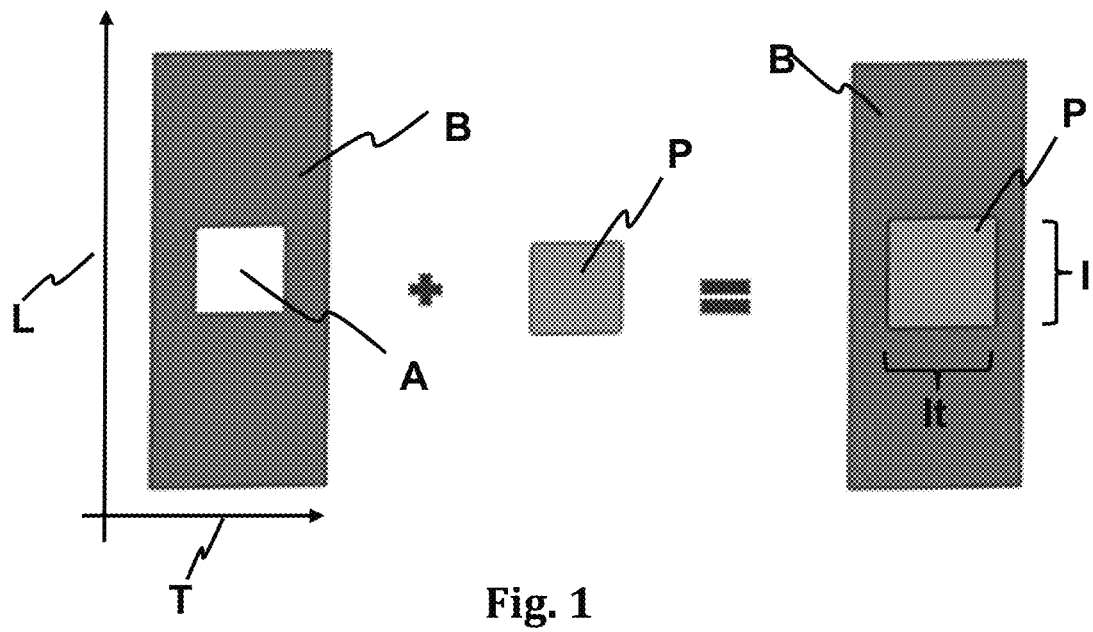
FIG. 1 illustrates a step in the manufacture of the metal structural component in which a patch is applied to a cut-out region in a planar blank, for example by welding.
Figure 2:
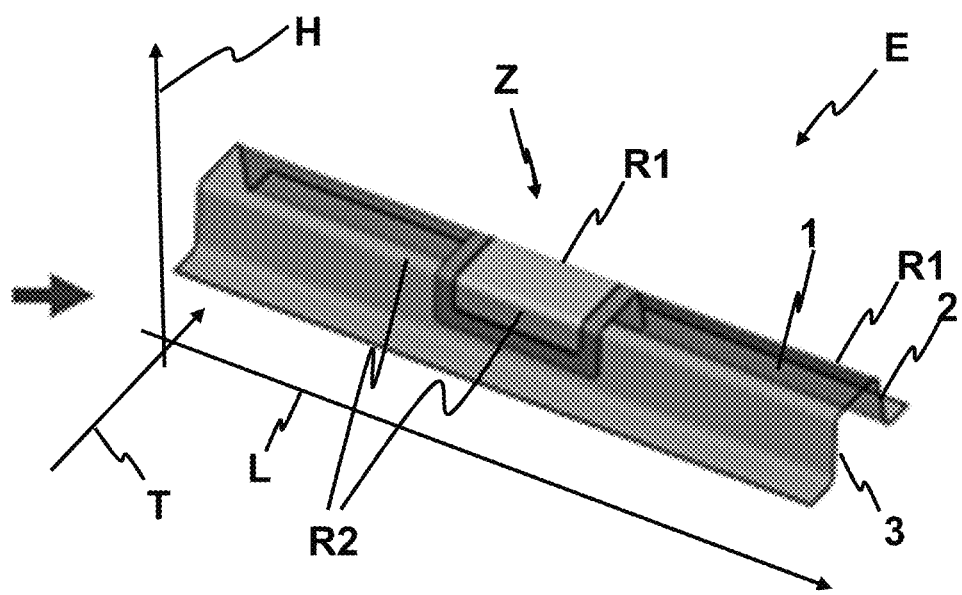
FIG. 2 illustrates a further step in the manufacture of the metal structural component in which the assembly formed by the blank and the patch is stamped to obtain the component having at least one portion of U-shaped cross-section.

FIGS. 1 and 2 schematically illustrate the manufacture of a metal component according to the invention. In FIG. 1, a blank B is used to manufacture the component. The blank B is a planar sheet of metal which spans a longitudinal direction L and a transverse direction T. An opening A is cut out of the sheet, for example by laser cutting or during the blanking process. The sheet B may be of steel. A suitably sized patch P is produced from another material of higher ductility, for example extra high strength steel (EHSS) or very high strength steel (VHSS). The patch P is sized such as to cover the opening A. The patch is then applied to cover the opening A, for example by welding.

FIG. 2 shows the combined blank and patch after being shaped into a component E comprising a portion with a U-shaped cross-section, for example by stamping. In this figure, a further direction H is defined in which the lateral walls 2, 3 of the U-shaped portion extend. The lateral walls 2, 3 and the bottom 1 form the U-shaped cross-section. The transition from each wall 2, 3 to the bottom 1 is rounded such that rounded portions R1, R2 may be defined at each transition. An intermediate zone Z is also defined in the U-shaped portion where the patch has been applied, such that the intermediate zone Z has a greater ductility than the surrounding portion of the component and has a first determined length l in the longitudinal direction.

Figure 3A:
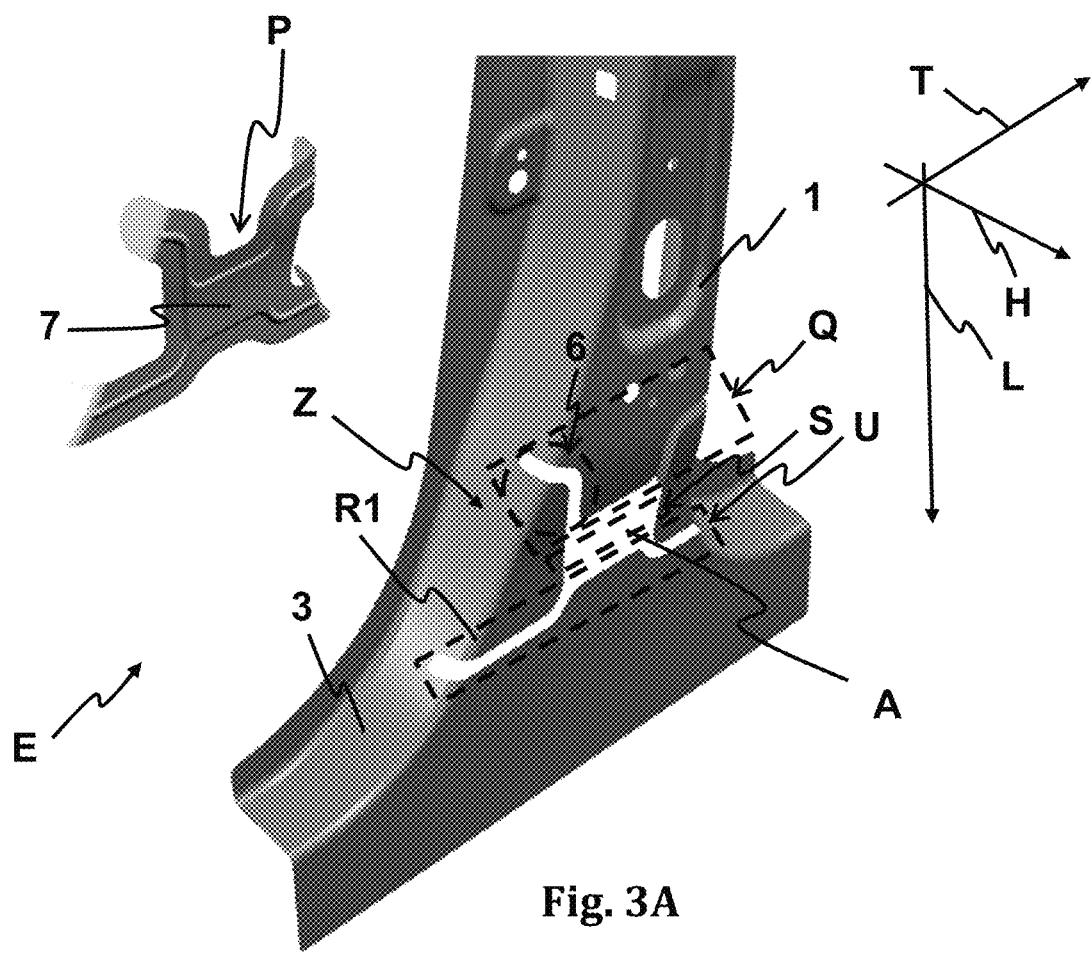
FIG. 3A shows an exploded view of the metal structural component according to a first preferred embodiment of the invention in which the component is a B-pillar.

FIG. 3A shows an exploded view of a metal component, in this case a B-pillar, according to the first preferred embodiment of the invention. The B-pillar is made of a main metal material, for example steel. Although the dimensions of the cross-section vary in the longitudinal direction, a portion with a substantially U-shaped cross section may be identified in the B-pillar and includes the intermediate zone Z. The opening A in the main material has an irregular shape in which various portions may be defined: a first portion Q which spans part of the lateral walls 2, 3 and the bottom 1 of the U-shaped portion and which has a second length lt in the first transverse direction T, a second portion S having a length lower than lt in the first transverse direction T, and a third portion U which also spans part of the lateral walls 2, 3 and the bottom 1. Each of the first and third portions Q, U comprises extensions 6 which extend from the second portion S of the opening to each lateral wall 2, 3.

Figure 3B:
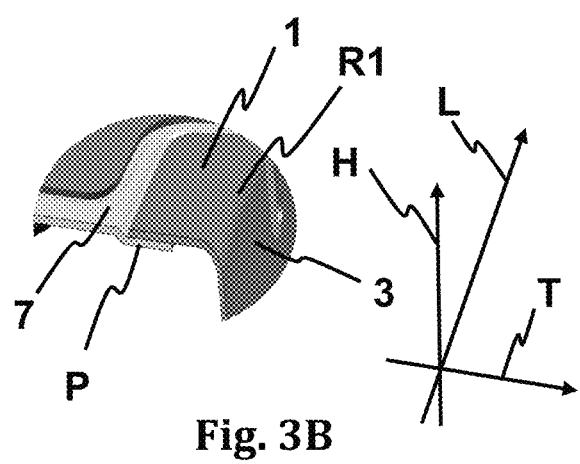
FIG. 3B shows a close-up view of the union between the patch and the blank in the B-pillar of FIG. 3A.

The patch P has a raised region 7 with a shape complementary to that of the opening A such that when assembled, the region of the opening A has a reduced thickness compared to the surrounding material. This is shown in more detail in FIG. 3B.

Figure 4A:
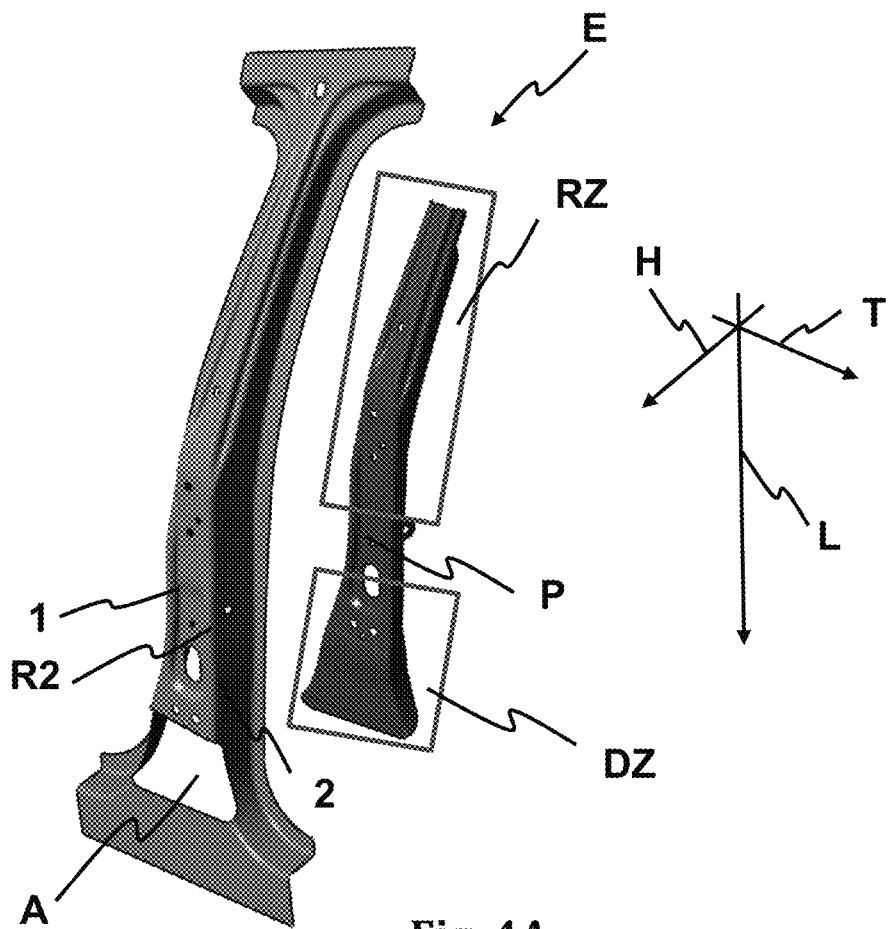
FIG. 4A shows an exploded view of the metal structural component according to a second preferred embodiment of the invention in which the component is a B-pillar.
Figure 4B:
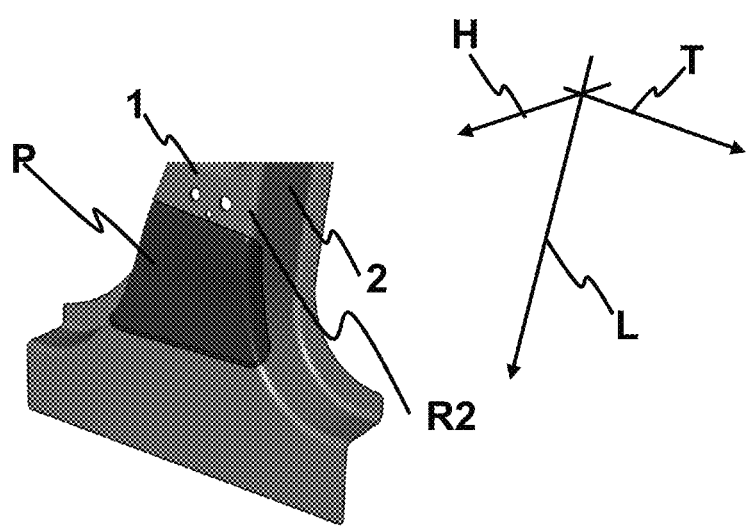
FIG. 4B shows a close-up view of the patch assembled to the component of FIG. 4A.

FIG. 4A shows an exploded view of a B-pillar according to a second preferred embodiment of the invention. In this embodiment, the patch P is significantly bigger than the opening A and overlaps more significantly with the main material of the B-pillar. A first portion DZ of the patch P may be defined as the portion of the patch in the opening A. This portion may also be raised to provide a seamless transition in the surface of the B-pillar from the main material to the patch. A second portion RZ may be defined as the portion of the patch P which overlaps the main material. This may be joined to the main material by welding, for example. FIG. 4B shows in more detail the first portion DZ assembled in the B-pillar.

Figure 5:
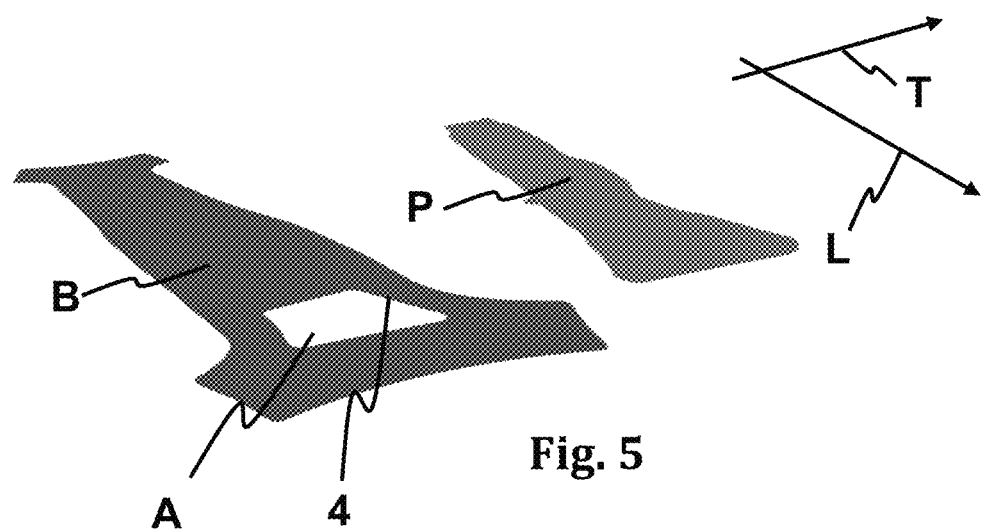
FIGS. 5, 6 and 7 show steps in the manufacture of the B-pillar of the second embodiment.
Figure 6:
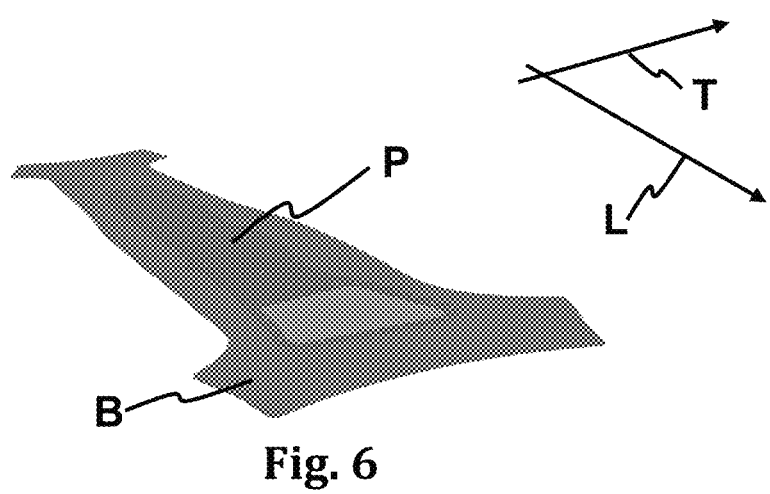
Figure 7:
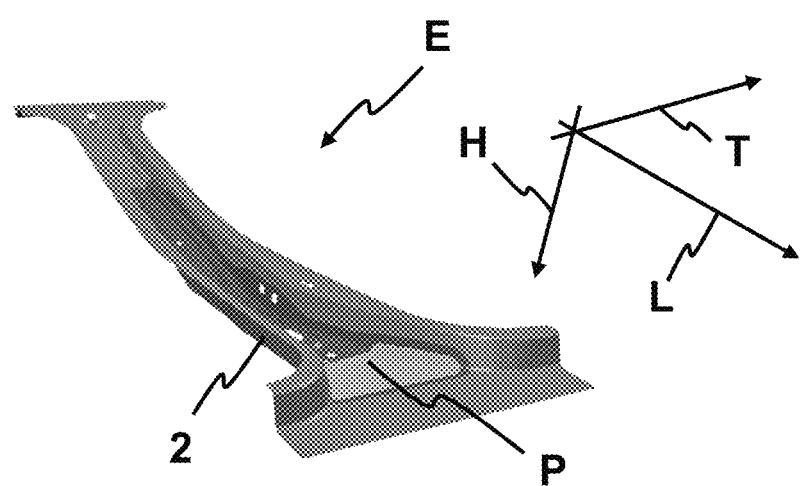

FIGS. 5, 6 and 7 illustrate various steps in the manufacture of the B-pillar of the second embodiment. A blank B of the main material is cut or produced to a flat shape and an aperture A is formed in the blank. In this figure, the edges which define the opening are labelled as 4. A planar patch P is formed or cut from another planar higher-ductility material. FIG. 6 shows a union between the patch P and the planar blank B by spot welding, represented by the spots around the edges 4 and in the second portion RZ of the patch. The final component E, in this case a B-pillar, is then hot-stamped to form its 3-dimensional shape which comprises a portion with a U-shaped cross-section. The U-shaped cross-section covers possibilities that include lateral walls 2,3 and a bottom 1 between the lateral walls, regardless of the angle or curvature between the walls and the bottom and includes possibilities where a U-shape may be identified within a larger shape, for example an Ω-shape.

Figure 8:
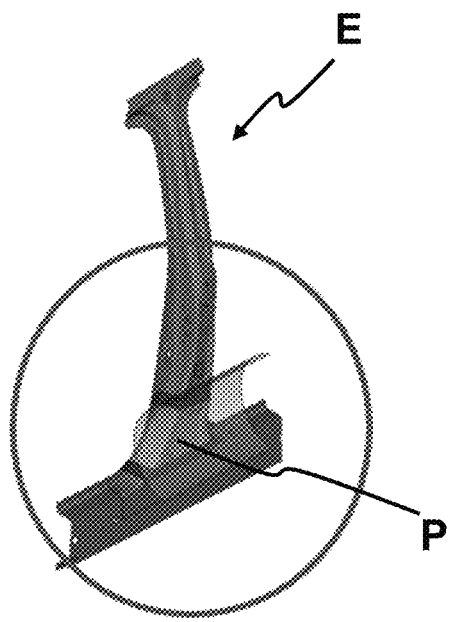
FIG. 8 illustrates the effects of a sideways impact on a B-pillar comprising a higher-ductility area according to a known manufacturing process.
Figure 8:
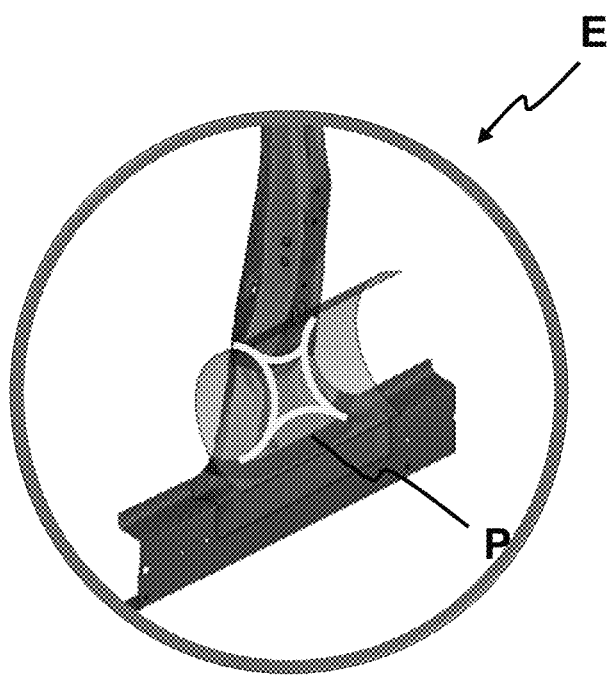

FIGS. 8 to 12 illustrate some of the effects of the inclusion of a higher-ductility patch P according to the invention in an automotive component, for example a B-pillar. FIG. 8 shows a monolithic B-pillar manufactured according to known processes, for example by integrated hot stamping. Application of a lateral impact to the B-pillar results in a greater deformation of the ductile area than the main material. However, as the ductile area extends transversally across the whole part, the part has a tendency to fold and possibly break along the lines shown. Such a folding or breakage would reduce the integrity of a vehicle cabin.

Figure 9:
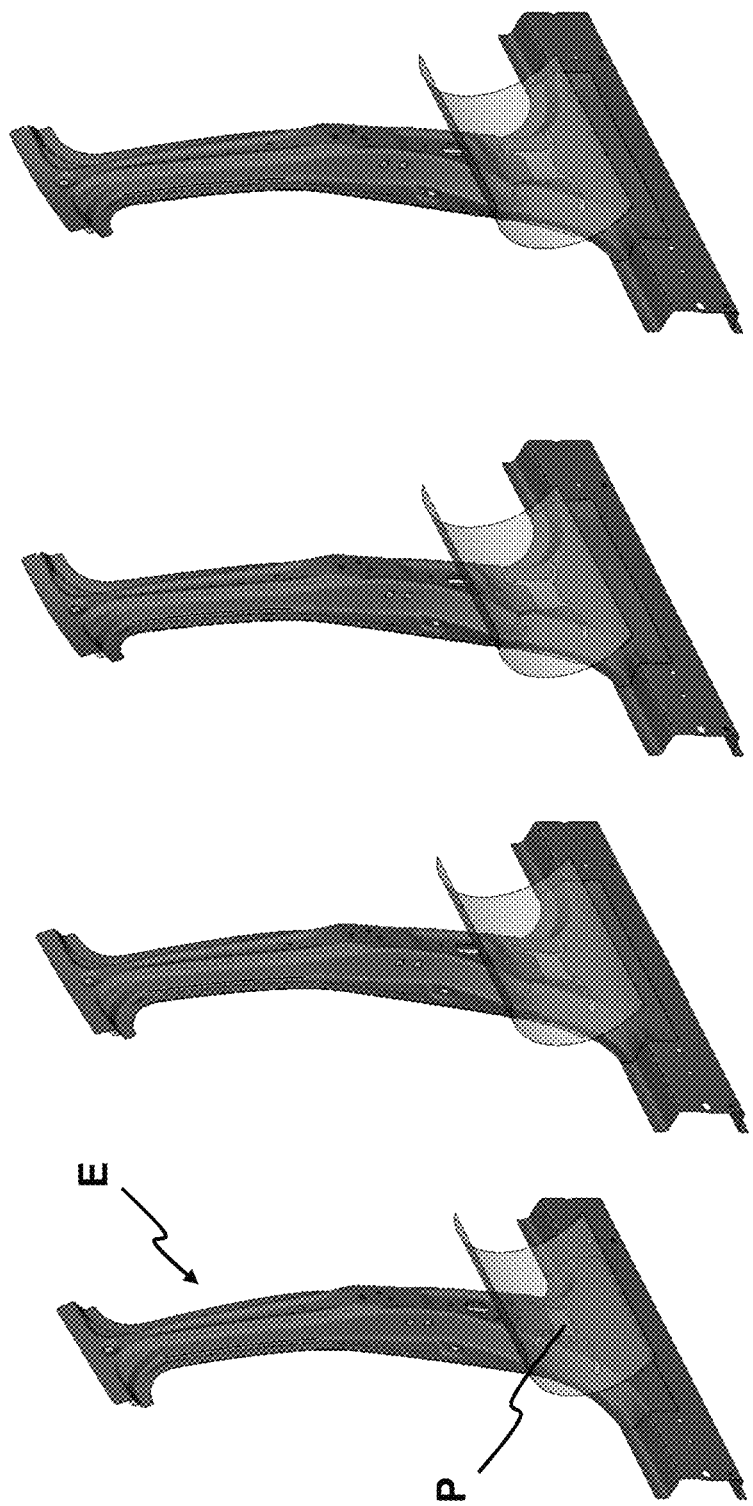
FIGS. 9 and 10 illustrate a time-lapse of the effects of the same sideways impact on the B-pillar of the first embodiment.
Figure 10:
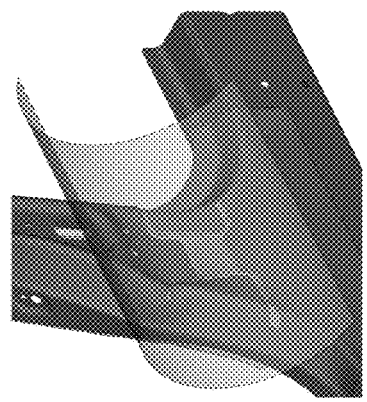
Figure 10:
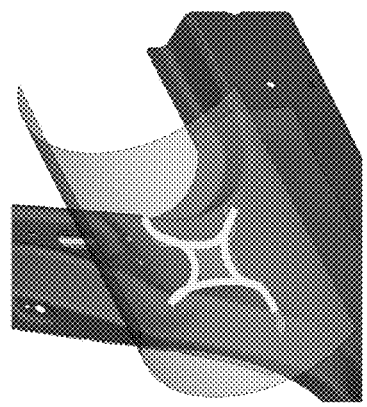
Figure 10:
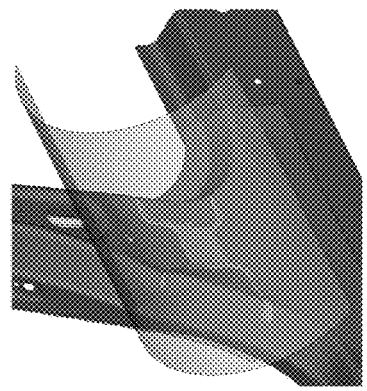
Figure 10:
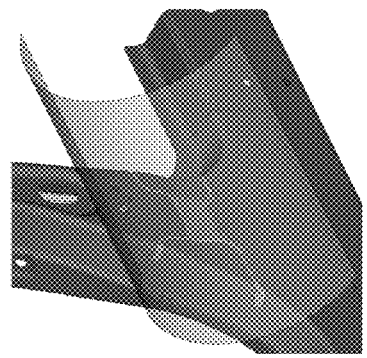

FIG. 9 illustrates, for comparison, the effects of a lateral impact on the B-pillar of the first embodiment. In this case, the shape of the patch P matches more closely the most vulnerable areas of the B-pillar to a lateral impact. A smaller cut-out is used in comparison to the second embodiment and the remainder of the component retains its integrity. Upon impact, the overall deformation to the B-pillar is lower than observed in known processes and is substantially contained to the patch.

Figure 11:
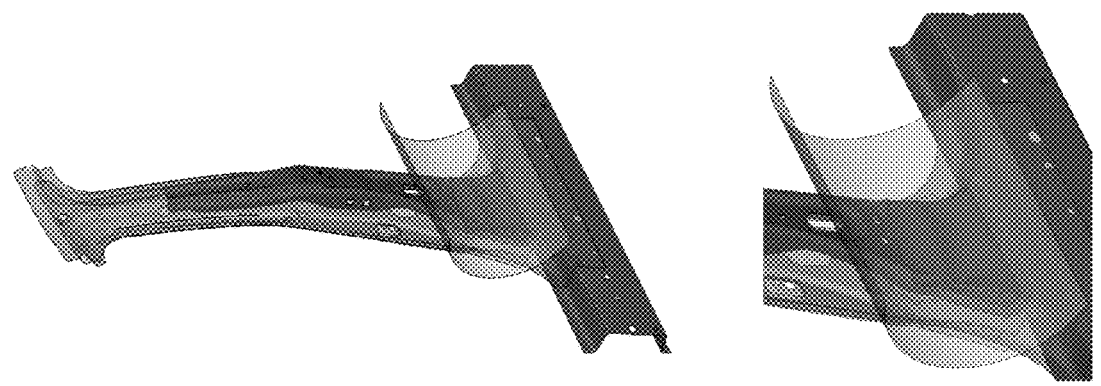
FIGS. 11 and 12 illustrate a time-lapse of the effects of the same sideways impact on the B-pillar of the second embodiment.
Figure 11:
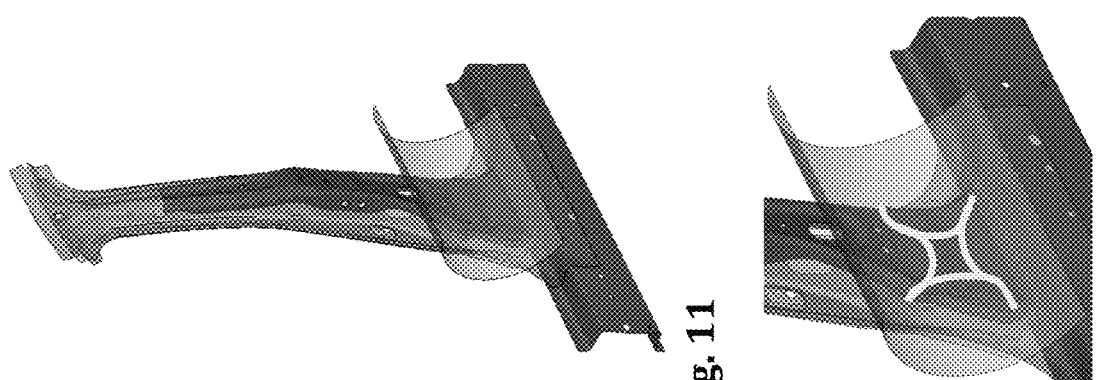
Figure 12:
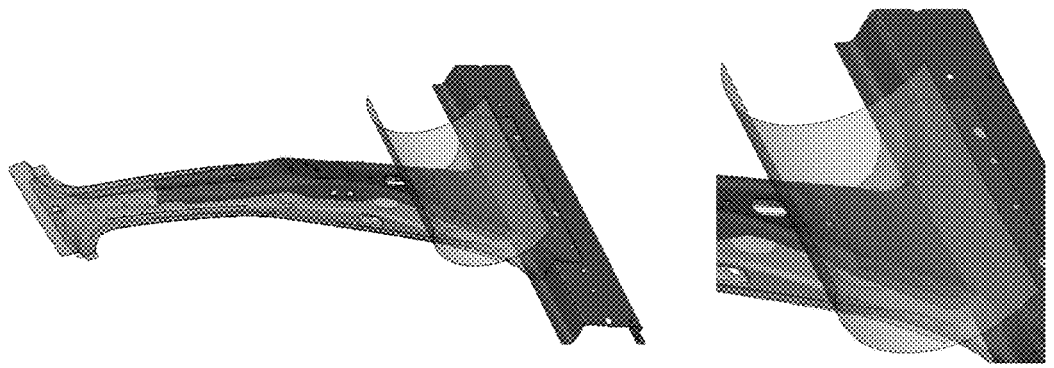
Figure 12:
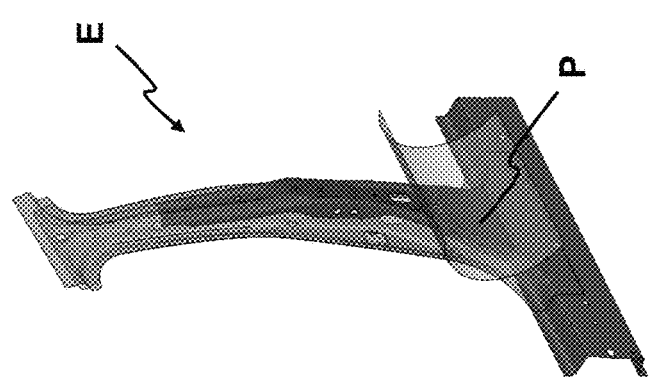

FIGS. 11 and 12 illustrate the effects of the same sideways impact on the B-pillar of the second embodiment. Similarly, the main deformation occurs in the patch P whereas the lateral sides 2, 3 and overall shape of the B-pillar are less affected. In FIG. 12, the lines showing the area of main deformation are contained within the higher-ductility patch P whereas the higher-strength lateral areas of the B-pillar remain unaffected and the interior of the vehicle cabin is not intruded upon.

This concept may be applied to other metal components, in particular to automotive components where a shock absorbing area would be advantageous.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. Method of manufacturing a metal structural component (E) for a vehicle, the component (E) being a profile with at least one portion having a U-shaped cross-section, the portion having a bottom (1) and two lateral walls (2, 3), the portion having a longitudinal direction (L), a first transverse direction (T) and a second transverse direction (H), so that in the U-shaped cross-section of the portion are defined:
    a bottom (1) of the portion, the bottom (1) having a direction coinciding with the first transverse direction (T);
    a first lateral wall (2) and a second lateral wall (3) of the portion, the two lateral walls (2, 3) having directions coinciding with the second transverse direction (H);
    an intermediate zone (Z) of the portion having a U-shaped cross-section, having a first determined length (l) according to the longitudinal direction (L), wherein the intermediate zone (Z) comprises a metal having greater ductility than a main material of the component (E) that surrounds the intermediate zone (Z),
the method comprising the steps of:
    a) providing a planar blank (B) which spans the longitudinal (L) and the first transverse (T) directions;
    b) cutting out the blank (B) to create an opening (A) having a first portion (Q) and wherein the first portion (Q) of the opening (A) has a second length (lt) in the first transverse direction (T);

c) welding a patch (P) to the blank (B) so as to cover the opening (A), the patch (P) being made of the metal having greater ductility than the material of the blank (B);

d) stamping the assembly formed by the blank (B) and the patch (P) to obtain the component (E) having the at least one portion having a U-shaped cross-section so that at least part of the bottom (1) of the portion corresponds to the patch on said first determined length (l) and the first portion (Q) of the opening (A) of the blank (B) having the second length (lt) in the first transverse direction (T) extends from the first lateral wall (2) to the second lateral wall (3) of the at least one portion.

2. The method according to claim 1, wherein the first lateral wall (2) of the portion having a U-shaped cross-section comprises a first curved portion (R1), wherein the first curved portion (R1) joins the first lateral wall (2) to the bottom (1) of the portion having a U-shaped cross-section, and wherein the first curved portion (R1) has a curvature higher than the curvature of the bottom (1) of the portion; and/or wherein the second lateral wall (3) of the portion having a U-shaped cross-section comprises a second curved portion (R2), wherein the second curved portion (R2) joins the second lateral wall (3) to the bottom (1) of the portion having a U-shaped cross-section, and wherein the second curved portion (R2) has a curvature higher than the curvature of the bottom (1) of the portion.

3. The method according to claim 1, wherein step c) is performed such that the patch covers the entire opening (A) of the blank (B).

4. The method according to claim 1, wherein a first portion (DZ) of the patch (P) covers the opening (A) of the blank (B) and a second portion (RZ) of the patch (P), is welded in overlap to the blank (B), creating a region of the component (E) with a double thickness, preferably wherein the maximum length of the Patch (P) in the longitudinal direction (L) is at least double the maximum length in the longitudinal direction of the first portion (DZ) of the patch (P) covering the opening (A).

5. The method according to claim 1, wherein the opening (A) cut out in step b) has a maximum length in the longitudinal direction (L) and step d) is performed such that the opening (A) extends from the first lateral wall (2) to the second lateral wall (3) along the whole longitudinal direction (L).

6. The method according to claim 1, wherein:
the opening (A) cut out in step b) has a maximum length in the longitudinal direction (L), and a first section of said maximum length of the opening (A) comprises the first portion (Q) of the opening (A), and a second section of said maximum length of the opening (A) comprises a second portion(S) of the opening (A), the second portion(S) having a length in the first transverse direction (T) lower than the length (lt) in the first transverse direction of the first portion (Q), such that upon performing step d) the second portion(S) of the opening is laterally limited by the bottom (1) of the portion having a U-shaped cross-section along the second section of the maximum length.

7. The method according to claim 6, wherein the maximum length of the opening (A) in the longitudinal direction (L) comprises a third section, wherein the third section comprises a third portion (U) of the opening (A), wherein the third portion (U) extends from one of the lateral walls (2) to the other lateral wall (3), and wherein the second portion (S) of the opening (A) is between the first portion (Q) of the opening (A) and the third portion (U) of the opening (A).

8. The method according to claim 6, wherein the first portion (Q) of the opening (A) comprises at least one extension (6) having a width and a length such that the width is lower than the length, and wherein the at least one extension (6) extends from the second portion(S) of the opening (A) to a lateral wall (2, 3) of the portion having a U-shaped cross-section; and/or wherein the third portion (U) of the opening (A) comprises at least one extension (6) having a width and a length such that the width is lower than the length, and wherein the at least one extension (6) extend from the second portion(S) of the opening (A) to a lateral wall (2, 3) of the portion having a U-shaped cross-section.

9. The method according to claim 1, wherein the opening (A) of step b) is limited by an edge (4) of the blank and upon performing step d) the patch (P) has a raised portion (7) entering the opening (A), such that a thickness of the opening (A) is decreased.

10. The method according to claim 9, wherein upon performing step d) the raised portion (7) comprises the whole portion of the patch (P) covering the opening (A).

11. The method according to claim 1, wherein step d) is made by hot stamping.

12. A metal structural component (E) manufactured according to claim 1.

13. The metal structural component (E) according to claim 12, wherein the metal structural (E) component is a B-pillar.

14. A motor vehicle comprising the metal structural component (E) according to claim 12.

* * * * *